US011468394B2

(12) United States Patent
Minh et al.

(10) Patent No.: US 11,468,394 B2
(45) Date of Patent: *Oct. 11, 2022

(54) SYSTEMS AND METHODS FOR AUTOMATED MERGING OF SPLIT DELIVERIES TO A SINGLE CUSTOMER

(71) Applicant: COUPANG CORP., Seoul (KR)

(72) Inventors: Hyun Sik Eugene Minh, Seoul (KR); Yoo Suk Kim, Seoul (KR); Erik Rehn, Seoul (KR)

(73) Assignee: Coupang Corp., Seoul (KR)

( * ) Notice: Subject to any disclaimer, the term of this patent is extended or adjusted under 35 U.S.C. 154(b) by 147 days.

This patent is subject to a terminal disclaimer.

(21) Appl. No.: 17/117,045

(22) Filed: Dec. 9, 2020

(65) Prior Publication Data

US 2021/0182784 A1    Jun. 17, 2021

Related U.S. Application Data

(63) Continuation of application No. 16/717,872, filed on Dec. 17, 2019, now Pat. No. 10,891,583.

(51) Int. Cl.
*G06Q 10/08* (2012.01)
*G06Q 30/06* (2012.01)

(52) U.S. Cl.
CPC ..... *G06Q 10/0835* (2013.01); *G06Q 30/0635* (2013.01)

(58) Field of Classification Search
CPC .............. G06Q 10/083; G06Q 10/0832; G06Q 10/0833; G06Q 10/0853; G06Q 10/0837; G06Q 10/0838
See application file for complete search history.

(56) References Cited

U.S. PATENT DOCUMENTS

| 9,760,854 | B1 | 9/2017 | Chowdhary |
| 2006/0041481 | A1 | 2/2006 | Stowe |

(Continued)

FOREIGN PATENT DOCUMENTS

| CN | 106600057 A | 4/2017 |
| KR | 10-2005-0008925 A | 1/2005 |

(Continued)

OTHER PUBLICATIONS

Slater, Alan,"Specification for a dynamic vehicle routing and scheduling system", International Journal of Transport Management 1, 29, 40 (Year: 2002).*

(Continued)

*Primary Examiner* — Emmett K. Walsh

(74) *Attorney, Agent, or Firm* — Finnegan, Henderson, Farabow, Garrett & Dunner, LLP

(57) ABSTRACT

Disclosed embodiments are generally directed to computerized system for delivery wave scheduling. The methods may comprise at least: receiving, from a remote system, order information comprising a plurality of products and associated identifiers; determining fulfillment centers and delivery waves, from a plurality of delivery waves, for each product in the plurality of products, based on the associated identifier and the remote system; storing the determined delivery waves in association with the products in a database; determining that at least one delivery wave is associated with an earlier time period than a later delivery wave, and responsive thereto: modifying the database so that the products originally associated with the earlier delivery waves are associated with the later delivery wave; and forwarding computer (Continued)

instructions to at least one mobile device to generate a graphical user interface displaying the products and information associated with the second delivery wave.

20 Claims, 12 Drawing Sheets

(56) References Cited

U.S. PATENT DOCUMENTS

| | | |
|---|---|---|
| 2006/0238334 A1 | 10/2006 | Mangan |
| 2010/0027461 A1 | 10/2010 | Andersen et al. |
| 2011/0258134 A1 | 10/2011 | Mendez |
| 2011/0320034 A1 | 12/2011 | Dearlove |
| 2014/0279667 A1 | 9/2014 | Gillen |
| 2015/0081480 A1 | 3/2015 | Narita |
| 2015/0294260 A1 | 10/2015 | Napoli |
| 2015/0317598 A1 | 11/2015 | Stowe |
| 2016/0063438 A1 | 3/2016 | Shuken et al. |
| 2016/0342932 A1 | 11/2016 | Imaeda et al. |
| 2017/0323250 A1 | 11/2017 | Lindbo et al. |
| 2018/0308051 A1 | 10/2018 | Nemati |
| 2018/0314999 A1 | 11/2018 | Nemati |
| 2019/0147522 A1 | 5/2019 | Susser |
| 2019/0149952 A1 | 5/2019 | Parks |

FOREIGN PATENT DOCUMENTS

| | | |
|---|---|---|
| KR | 10-2007-0037604 A | 4/2007 |
| TW | I441090 B | 6/2014 |

OTHER PUBLICATIONS

Office Action and Search Report from the Taiwan Intellectual Property Office in counterpart Taiwan Patent Application No. 109134590, dated Mar. 16, 2021 (33 pages).
Examination Report from the Australian Patent Office in counterpart Australian Application No. 2020264279 (7 pages).
A. Slater, "Specification for a dynamic vehicle routing and scheduling system," International Journal of Transport Management, 1, 29, 40 (2002).
Examination Notice of Standard Hong Kong Patent (O) Application No. 22020017728.9 dated Dec. 21, 2021, 6 pgs.
Office Action from corresponding Japanese Application No. 2020-572676 dated Jul. 5, 2022 (8 pages).
Notice of Preliminary Rejection from counterpart Korean Patent Application No. 10-2021-0109588 dated Jun. 23, 2022, 11 pages.
Extended European Search Report from counterpart European Application No. 20827970.3, dated Jul. 25, 2022 (11 pages).

* cited by examiner

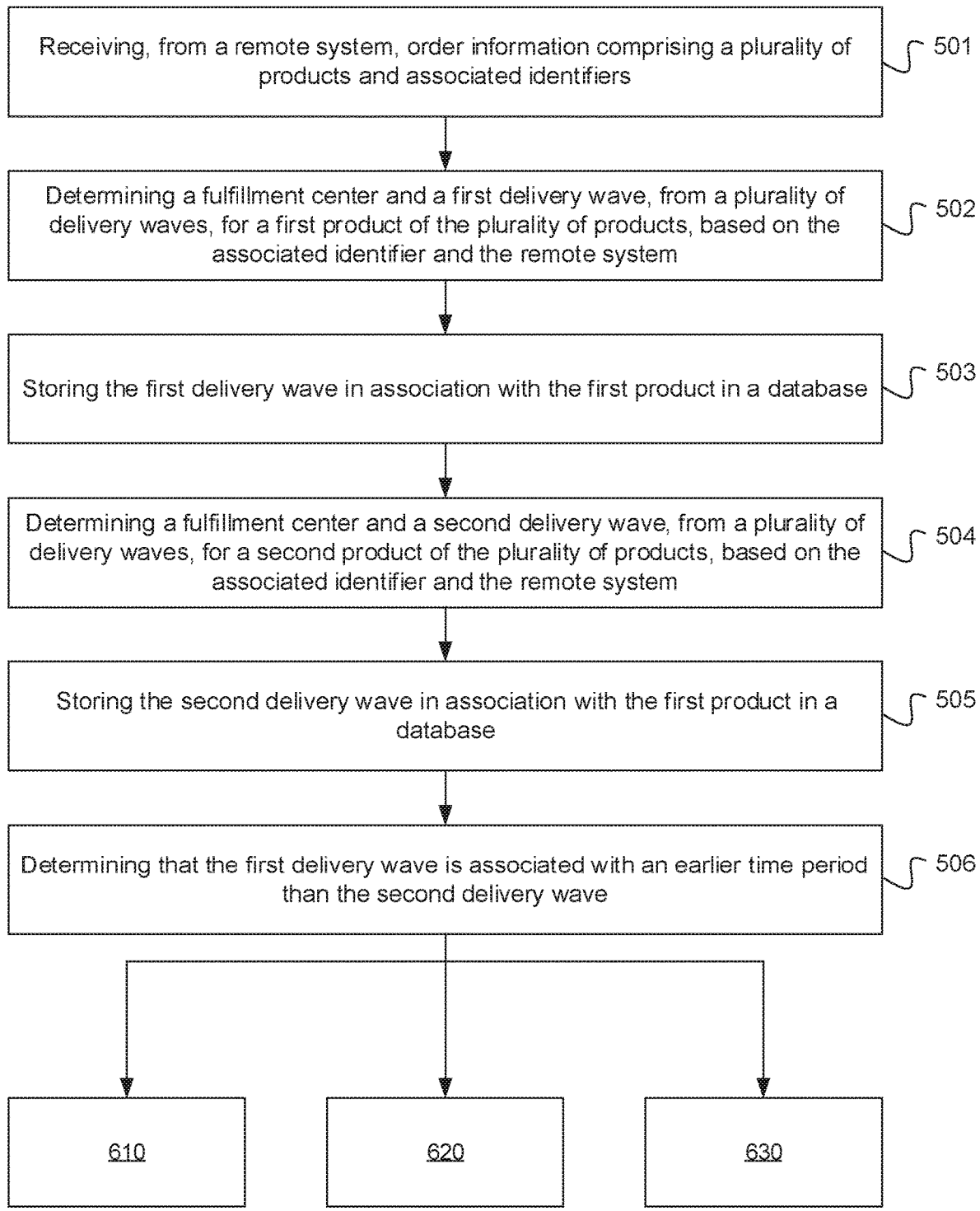

610

---

| Modifying the database to associate the first product with the second delivery wave | — 611 |

↓

| Forwarding computer instructions to at least one mobile device to generate a graphical user interface displaying the first product and information associated with the second delivery wave | — 612 |

| Forwarding a second set of computer instructions to a printing device, the second set of computer instructions configured to cause the printing device to print a label listing the information associated with the second wave. | — 621 |

FIG. 6B

SYSTEMS AND METHODS FOR AUTOMATED MERGING OF SPLIT DELIVERIES TO A SINGLE CUSTOMER

CROSS-REFERENCE TO RELATED APPLICATIONS

This application is a continuation of and claims priority to U.S. application Ser. No. 16/717,872, filed on Dec. 17, 2019 (now allowed), the entire contents of which are incorporated herein by reference.

TECHNICAL FIELD

The present disclosure generally relates to computerized systems and methods for automatic rescheduling of package delivery. In particular, embodiments of the present disclosure relate to inventive and unconventional systems that analyze electronic order information through a logistics management system based on a collection of data from multiple subsystems to determine when split deliveries can be consolidated into a single delivery, and automatically rescheduling the deliveries upon such determination.

BACKGROUND

With the advancement and proliferation of computer technology, online shopping, also known as e-commerce, has become one of the major avenues of commerce. Consumers and businesses are purchasing goods from online vendors more frequently than ever, and the number of transactions and sales revenue are projected to grow year-over-year at a staggering rate. As the scope and volume of e-commerce continue to grow, both the number of different products available online and the average number of purchases made in a given period are also growing exponentially. For example, the number of different products sold by one popular online retailer is said to have reached more than 600 million products, and the number of packages shipped per day by the same retailer, 1.6 million.

Each online purchase, by nature, requires a delivery of the purchased goods to its intended recipient. Each online purchase or order typically comprises of one or more goods, wherein the one or more goods can be packaged into one or more packages, each with its own promised delivery date. A typical order may be processed via steps such as: receiving, from a customer, an order for one or more goods; retrieving the one or more goods from an inventory; packaging the one or more goods into one or more packages; and delivering the one or more packages to the intended recipient before the promised delivery date. The promised delivery date may be set by the retailer itself or a shipping courier, or a specific date may be requested by the customer, which then may be assigned as the promised delivery date. An ideal system of order processing would deliver each package to the intended recipient by the promised delivery date without failure.

Order processing systems, in some cases, may operate using a "wave process," where products are scheduled to be delivered to a specified area during one or more waves in a given time period. For example, wave deliveries may include a first wave of packages around a specific area (e.g., a route comprising sub-routes) at one time a day, and then a second wave of packages to the same area later in the day. This process may be used as an alternative to a "shift process," where products are delivered in one or more shifts in different areas (e.g., two shifts cover two halves of a specified area). A "wave process" may offer certain advantages over a "shift process." For example, a "wave process" may provide excellent area coverage and may enable deliveries to certain areas where delivery would otherwise be unavailable. However, since the "wave process" may cover the same area multiple times in a day, utilizing this process may result in delivering products to the same location multiple times a day when only one delivery is necessary, greatly increasing costs.

Currently existing computerized order processing systems include a varying degree of automation and complexity in implementing the steps described above. With increasing number of different goods and orders, however, aggravated by the fact that the orders need to go through a complex network of subsystems and that some orders have complicating factors such as a partial return, current systems are problematic in that they are incapable of or largely inefficient at determining when multiple deliveries to the same recipient can be consolidated into one in order to reduce costs (i.e., every package in the order is delivered to the intended recipient in a single wave rather than multiple waves).

Therefore, there is a need for improved methods and systems for the automated consolidation of the delivery of multiple packages across multiple delivery waves into a single wave in order to reduce costs resulting from delivering to the same location multiple times when only one delivery is necessary.

SUMMARY

One aspect of the present disclosure is directed to a computerized system for delivery wave scheduling. The system may include: at least one processor; and at least one non-transitory storage medium including instructions that, when executed by the at least one processor, cause the at least one processor to perform steps comprising: receiving, from a remote system, order information including a plurality of products and associated identifiers; determining a fulfillment center and a first delivery wave, from a plurality of delivery waves, for a first product of the plurality of products, based on the associated identifier and the remote system; storing the first delivery wave in association with the first product in a database; determining a fulfillment center and a second delivery wave, from the plurality of delivery waves, for a second product of the plurality of products, based on the associated identifier and the remote system, the second delivery wave being different from the first delivery wave; storing the second delivery wave in association with the second product in the database; determining that the first delivery wave is associated with an earlier time period than the second delivery wave, and responsive thereto: modifying the database to associate the first product with the second delivery wave; and forwarding computer instructions to at least one mobile device to generate a graphical user interface displaying the first product and information associated with the second delivery wave.

Another aspect of the present disclosure is directed to a computer implemented method for delivery wave scheduling. The method may include: receiving, from a remote system, order information including a plurality of products and associated identifiers; determining a fulfillment center and a first delivery wave, from a plurality of delivery waves, for a first product of the plurality of products, based on the associated identifier and the remote system; storing the first delivery wave in association with the first product in a database; determining a fulfillment center and a second delivery wave, from the plurality of delivery waves, for a second product of the plurality of products, based on the associated identifier and the remote system, the second delivery wave being different from the first delivery wave; storing the second delivery wave in association with the second product in the database; determining that the first delivery wave is associated with an earlier time period than the second delivery wave, and responsive thereto: modifying the database to associate the first product with the second delivery wave; and forwarding computer instructions to at least one mobile device to generate a graphical user interface displaying the first product and information associated with the second delivery wave.

Yet another aspect of the present disclosure is directed to a computerized system for delivery wave scheduling. The system may include: at least one processor; and at least one non-transitory storage medium including instructions that, when executed by the at least one processor, cause the at least one processor to perform steps including: receiving, from a remote system, order information comprising a plurality of products and associated identifiers; determining a fulfillment center and a first delivery wave, from a plurality of delivery waves, for a first product of the plurality of products, based on the associated identifier and the remote system, the first wave being associated with a condition; storing the first delivery wave in association with the first product in a database; determining a fulfillment center and a second delivery wave, from the plurality of delivery waves, for a second product of the plurality of products, based on the associated identifier and the remote system, the second delivery wave being associated with a different time period than a time period associated with the first delivery wave; storing the second delivery wave in association with the second product in the database; determining that the time period associated with the first wave and the time period associated with the second occur during the same wave period; determining that the first delivery wave is associated with an earlier time period than the second delivery wave and that the second delivery wave was determined based on the second product not meeting the condition, and responsive thereto: modifying the database to associate the second product with the first delivery wave; forwarding computer instructions to at least one mobile device to generate a graphical user interface displaying the second product and information associated with the first delivery wave.

Other systems, methods, and computer-readable media are also discussed herein.

BRIEF DESCRIPTION OF THE DRAWINGS

FIG. 5 provides a flowchart illustrating a detailed exemplary merging process that may be executed to consolidate split deliveries, consistent with disclosed embodiments.

FIG. 6A provides an exemplary process that may be performed to reschedule the deliveries of multiple products upon determining that they should be delivered in the same wave, consistent with the disclosed embodiments.

FIG. 6B provides a flow chart illustrating an exemplary process that may be performed to print and replace a package label upon determining that its delivery should be rescheduled to another wave, consistent with the disclosed embodiments.

DETAILED DESCRIPTION

Figure 1A:
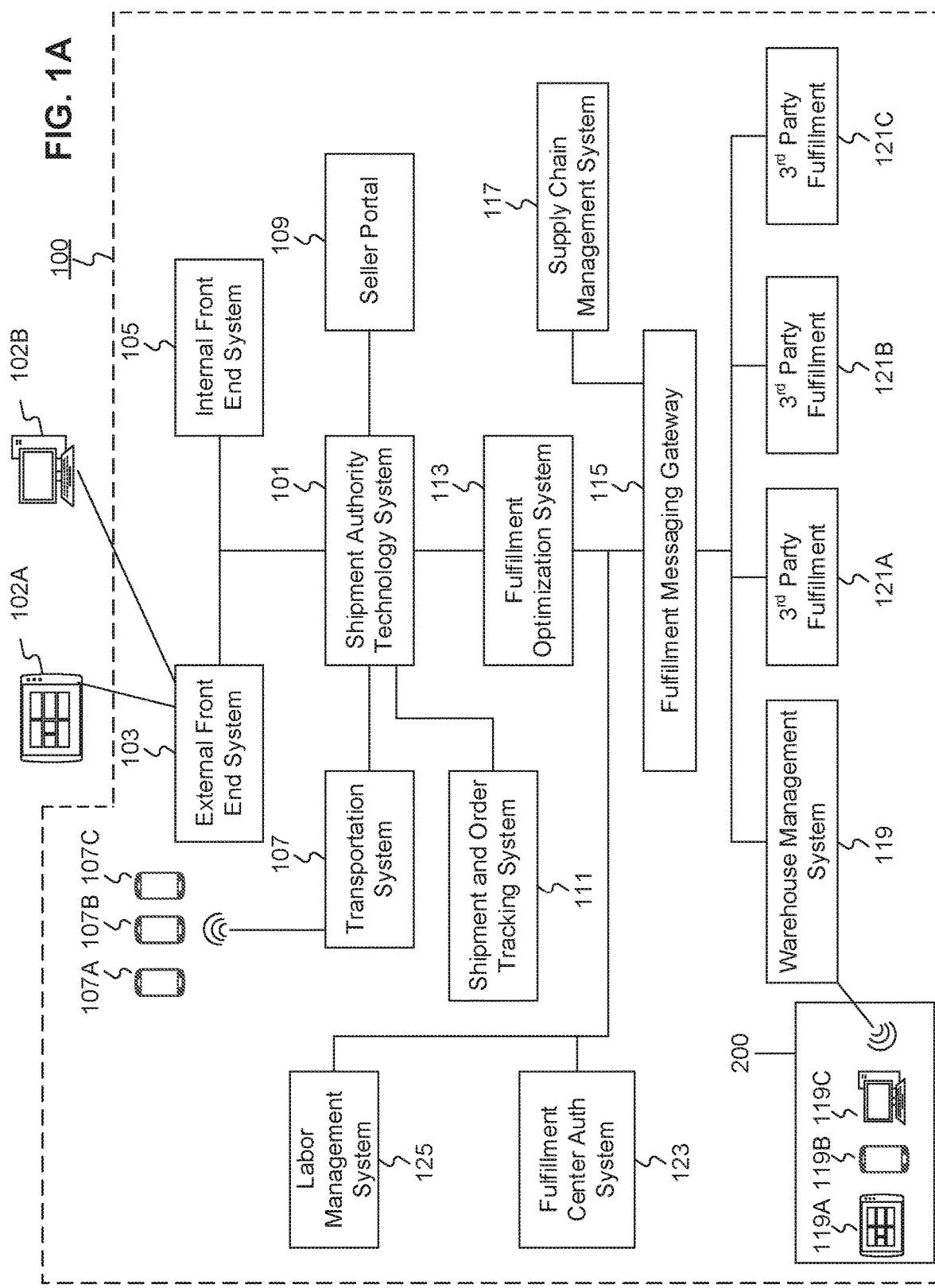
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Display Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for the automated merging of split deliveries to a single customer. Specifically, disclosed embodiments are directed towards consolidating the delivery of multiple packages across multiple delivery waves into a single wave in order to reduce costs resulting from delivering to the same location multiple times when only one delivery is necessary.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), 3$^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

3rd party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
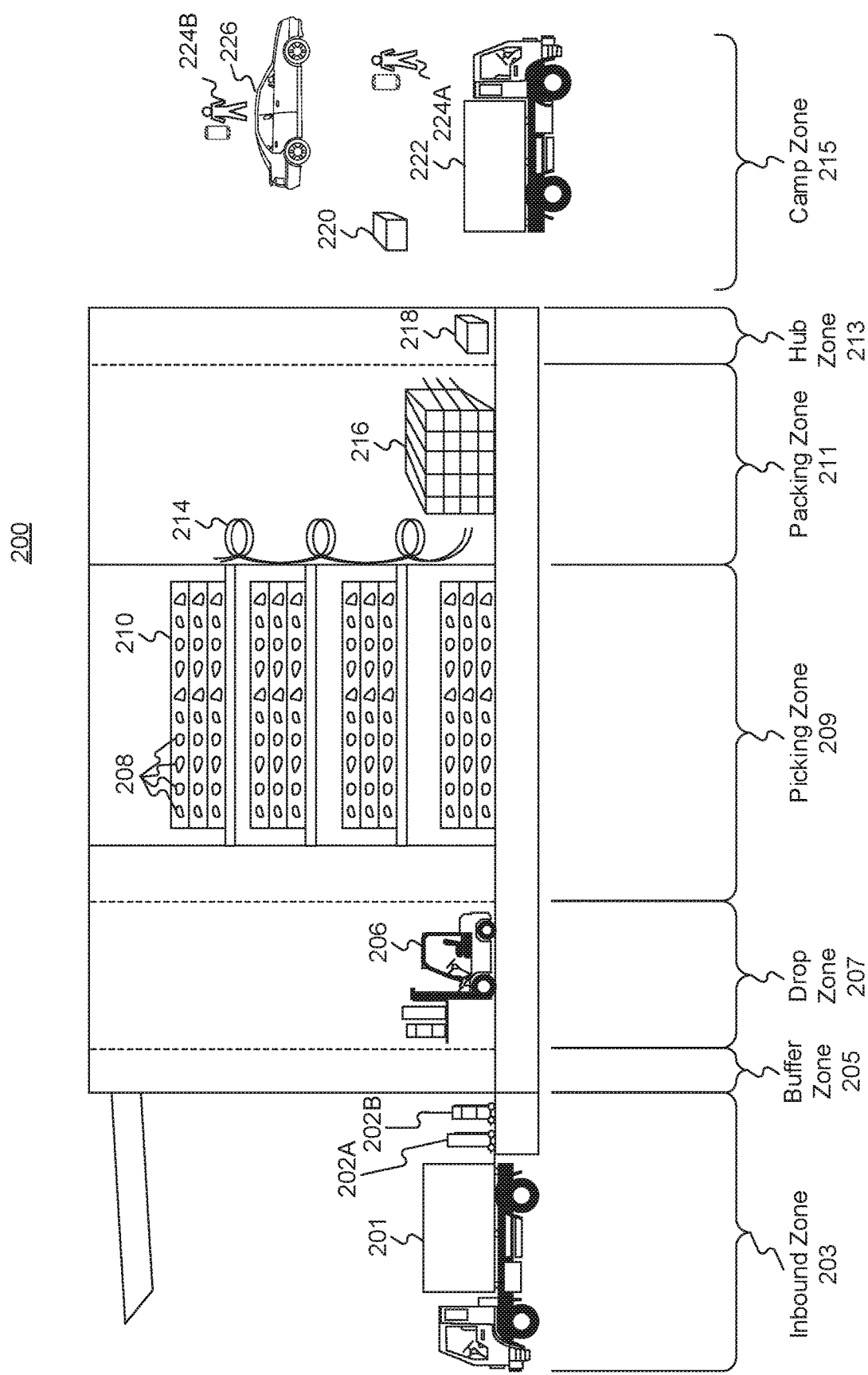
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 119B.

Once a user places an order, a picker may receive an instruction on device 119B to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Further, the disclosed delivery systems may operate in different delivery processes or paradigms. For example, the system may operate using a "wave process," a "shift process," or a combination. The wave process may arrange deliveries in waves of deliveries at different times. For example, wave deliveries may include a first wave of packages around a specific area (e.g., a route comprising sub-routes) several times during a specified wave period (e.g., a day). In contrast, a shift process may arrange deliveries to different areas, delivering first to a portion of a specific area (e.g., 50%), followed by a later delivery to a remaining portion of the specific area. The disclosed systems and methods may be configurable to reconfigure routes and worker schedules based on optimization parameters for the delivery process.

In some embodiments, a delivery system operating in a "wave process" may provide for the delivery of packages to customers within a specific delivery area during one of a plurality of waves during a specific wave period. For example, delivery workers may deliver packages to the intended recipients along a route or sub-route corresponding to the delivery area during a morning wave, and again during an afternoon wave. Each wave may correspond to both a cutoff time and a PDD. A cutoff time will generally correspond to an online order for shipment, and may be a time associated with a certain wave or a PDD of the order at which the wave or PDD associated with the wave become unavailable to the customer. In other words, if the customer does not order a package before the cutoff time, they will no longer be able to receive the item at the PDD associated with that cutoff time, and will only be able to receive the item at the next available PDD.

Utilizing a "wave process" might offer certain advantages for delivery systems over a "shift process." For example, because each wave may cover an entire area multiple times in a day whereas each shift may only be assigned to a specific area once a day, utilizing a "wave process" will result in much better area coverage than would be obtained from a "shift process." On the other hand, a "wave process" may also result in multiple deliveries to the same location in a single time period where only one delivery is necessary, increasing costs. This may result from, for example, a single order including multiple products, where the products are originally assigned to separate waves. For example, a customer may place an order for two products at 7:00 PM on a Monday with two-day shipping, so that both packages would arrive on Wednesday. However, the first product may have had a cutoff time of 8:00 PM associated with the morning wave on Wednesday, whereas the second product may have had an 6:00 PM cutoff time associated with the morning wave. Normally, this would result in the first product being delivered Wednesday morning and the second product being delivered in the afternoon. Disclosed embodiments address this inefficiency by enabling the consolidation of these split deliveries in a "wave process" and may thus greatly reduce the costs associated with said split deliveries.

In preferred embodiments, the disclosed processes may be executed by FO system 113. However, although disclosed processes will be described as being executed by FO system 113, the disclosed processes or portions thereof may be performed by system 100 as a whole or by any component of system 100 capable of performing at least a portion of the processes (e.g., one or more processors, SAT system 101, etc.). In some embodiments, FO system 113 may include at least one processor and at least one non transitory storage medium, or memory, storing instructions that, when executed by the at least one processor, cause the at least one processor to perform one or more of the processes described in the present disclosure.

Figure 3:
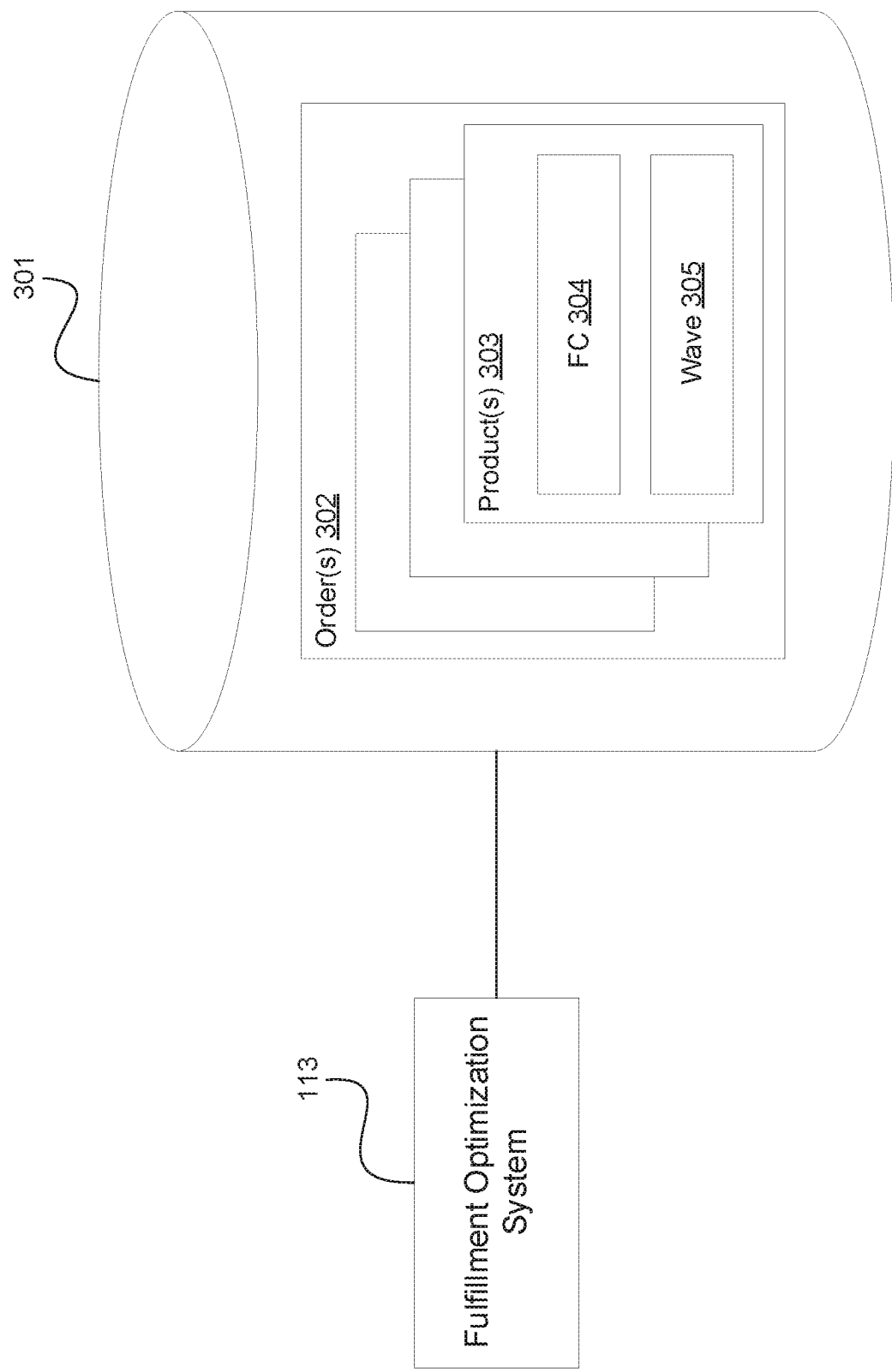
FIG. 3 is a block diagram illustrating an exemplary embodiment of a database accessible by a Fulfillment Optimization (FO) system, consistent with the disclosed embodiments.

FIG. 3 is a block diagram illustrating an exemplary embodiment of a database 301 accessible by FO system 113. Database 301 may be communicatively coupled with FO system 113 (e.g., via a network) so that FO system 113 may access, upload, and/or modify information stored in database 301. Database 301 may store order information relating to order(s) 302, such as a record of the one or more products 303 contained in the one or more orders. The database may further store information corresponding to each product 303 in the order, such as the associated FC 304 that the product will be delivered from and the associated wave 305 that the item will be shipped during.

Figure 4:
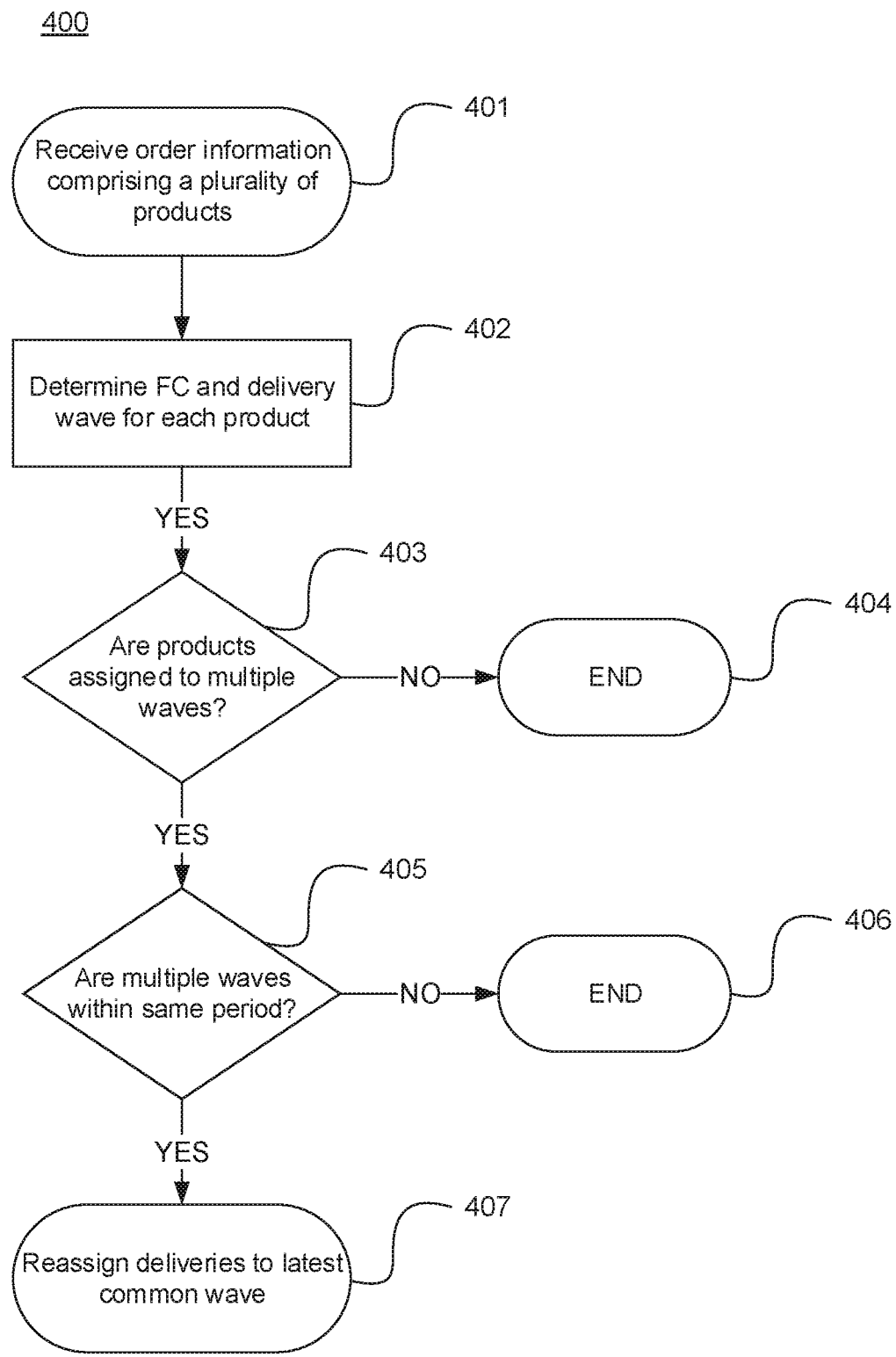
FIG. 4 provides a flow chart illustrating an exemplary merging process that may be executed to consolidate split deliveries, consistent with the disclosed embodiments.

FIG. 4 provides a flow chart illustrating exemplary merging process 400 that may be executed to consolidate split deliveries, consistent with disclosed embodiments. At step 401 of wave merging process 400, FO system 113 may receive order information comprising a plurality of products. For example, it may receive information indicating that a customer has ordered one or more products at a single time. In some embodiments, however, receiving order information comprising a plurality of products may include receiving information indicating that a customer has ordered products at separate times in multiple orders. Accordingly, the disclosed process for consolidating split deliveries may be applied to the deliveries of products that were ordered in one order or in multiple separate orders. After receiving the order information, process 400 may continue to step 402, where FO system may determine which FC each product should be delivered from and what wave they should be delivered in. FO system 113 might base these determinations on one or more of a variety of factors, such as the availability of each product among one or more FCs and the cutoff times and corresponding waves associated with each product in the order. At step 403, FO system 113 may determine whether the products are assigned to different waves.

If the products are not assigned to multiple waves, then wave merging process 400 may end at step 404 (i.e., no action is needed to consolidate split deliveries as all products in the order are scheduled for delivery in the same wave). If the products are assigned to multiple waves, FO system 113 may make another determination that the multiple waves fall within the same period of time. The period of time may be pre-determined and may correspond to a time period containing a set of waves (e.g., one or more days), or it may correspond to a time period associated with a PDD for one or more of the products. For example, if two products in an order are to be delivered in separate waves, but the waves occur on different days or weeks, then consolidating the delivery into a single wave may not be desired as it may result in considerable delay in delivering one of the products to the customer (e.g., consolidating the split deliveries would result in one or more products being delivered after the associated PDD). If the multiple waves are not within the same time period, then wave merging process may end at step 406 (i.e., no action is needed to consolidate the split deliveries as consolidation may delay delivery). Otherwise, at step 407, FO system 113 may reassign the delivery waves for one or more of the products if the assigned waves are within the same time period so that all of the products are delivered during the same wave. Reassigning the delivery waves may include one or more actions that FO system 113 may take to ensure that the products are delivered within the same wave (e.g., modifying database 301), which will be discussed in further detail with references to FIGS. 6A, 6B, and 6C.

FIG. 5 provides a flowchart illustrating a detailed exemplary merging process 500 that may be executed by FO system 113 to consolidate split deliveries, consistent with disclosed embodiments. Process 500 begins at step 501. At step 501, FO system 113 may receive order information including a plurality of products and associated identifiers (e.g., a barcode, an image, a text string, an RFID tag, or the like) from a remote system (e.g., external front end system 103, shipment and order tracking system 111, etc.). In some embodiments, the order information may correspond to a single order from a customer including the plurality of products. However, in some embodiments, the order information may include two customer orders, having a first product in a first customer order and a second product in a second customer order. In other words, multiple deliveries need not come from the exact same order in order to be consolidated into a single delivery through merging process 500. For example, the customer may order a plurality of products on one day and another plurality of products the next day. In this example, receiving the order information may include receiving both orders at different times and aggregating both orders into the order information.

After step 501 has been completed, merging process 500 may then continue to step 502. At step 502, FO system 113 may determine a FC and a first delivery wave, from a plurality of delivery waves, for a first product of the plurality of products, based on the associated identifier and the remote system. In some embodiments, the FC may be determined by determining a region associated with the remote system information and determining a FC from a set of FCs associated with the determined region. For example, the remote system information may include delivery information, such as a delivery address of the recipient, and FO system 113 may determine that the address is within a delivery region in a plurality of regions. After the region is identified, FO system 113 may consult an inventory record of products currently held at each FC in the region to determine which FCs are holding one or more of the products corresponding to the identifier corresponding to the first product (i.e., the availability of the product in each FC). In some embodiments, the associated identifier and the remote system may include a time-of-purchase of the product, the cutoff time associated with the time-of-purchase, and/or the wave associated with the cutoff time. Based on this information, FO system 113 may determine which FC in the region the product should be delivered from, and further determine the first wave that the first product should be delivered in. At step 503, FO system 113 may assign the product to the determined FC and delivery wave by storing the determined FC and first delivery wave in association with the first product in a database (e.g., database 301).

In some embodiments, determining the FC for a product may be based on a comparison of a schedule of waves between one or more FCs with the average travel time of the product through each FC. The schedule may be a record of waves for each FC, and may also include information indicating which waves are associated with the PDD of each product, for example. The average travel time of the product through each FC may be the average time it takes for the given product to move from the FC to the camp zone, and may be based on historic data stored in a database within system 100 (e.g., database 301) representing previous times associated with one or more similar products' movement through the FC. The historic data may be collected by FO system 113 on a continuing or periodic basis from one or more mobile devices (e.g., mobile devices 107A, 107B, 107C), and may include information such as times associated with the time of the product's time of arrival at different zones within the FC (e.g., inbound zone 203, drop zone 207, picking zone 209. hub zone, 213, camp zone 215, etc.). These times may be used to calculate the travel time for each product, and the aggregate travel times may be used to calculate the average travel time. The average travel time may be compared with the schedule of waves for each FC to determine whether the product will reach the camp zone of an FC by the time associated with the pick up for the associated wave.

In some embodiments, determining the FC may include storing a plurality of previous electronic requests and associated FCs in a database (e.g., database 301), dividing the previous electronic requests in a training dataset and a validation dataset, the training dataset having more requests than the validation dataset, and generating a predictive model based on the training data set associating request information and FCs. For example, FO system 113 may store historical data associated with previously ordered product in the database, the data indicating information associated with previous electronic requests (e.g., identifier of the product ordered in the request, associated FCs, waves, and/or PDDs, etc.). FO system 113 may use a larger portion of this data (i.e., training data set) to generate the predictive model. The predictive model may be an equation in the form of one or more general statistical models, such as a linear regression, a random forest, or a logistic regression representing the relationship between the electronic request information and the associated FCs.

After FO system 113 has generated a predictive model, it may, in some embodiments, validate the predictive model using the validation dataset. The validation dataset may be at least a portion of the historical data that was not used in generating the predictive model. To validate the predictive model, FO system 113 may generate a set of predicted associated FCs for each electronic request in the validation data set and compare the predicted associated FCs to the actual associated FCs. The predictive model may be validated if, for example, it meets a pre-determined confidence threshold (e.g., the model predicted at least 95% of associated FCs correctly). After the predictive model has been validated, FO system 113 may apply the model to future electronic requests to determine the associated FC.

After step 503 has been completed, merging process 500 may then continue to step 504. At step 504, FO system 113 may determine a FC and a second delivery wave, from the plurality of delivery waves, for a second product of the plurality of products, based on the associated identifier and the remote system, the second delivery wave being different from the first delivery wave. The FC and second delivery wave may be determined using processes similar to those just described with reference to determining the FC and the first delivery wave for the first product. At step 505, FO system 113 may store the second delivery wave in association with the second product in the database.

Although FIG. 5 depicts steps as being performed in succession, these steps may be performed and any order or configuration, consistent with disclosed embodiments. For example, steps 502 and 503 may occur in series or in parallel to steps 504 and 505. Additionally, in some embodiments, FO system may determine that the FC associated with the first product and the FC associated with the second product are different from one another.

After step 505 has been completed, merging process 500 may then continue to step 506. At step 506, FO system 113 may determine that the first delivery wave is associated with an earlier time period than the second delivery wave. In some embodiments, FO system 113 may additionally determine that the first delivery wave and the second delivery wave fall within the same period of time. For example, after FO system 113 determines that separate products ordered by the same customer are being delivered to the customer in separate waves, it may further determine that the separate waves occur on the same day. In this example, the FO system 113 may therefore determine that the products should be delivered in the same wave so that costs associated with the split deliveries may be eliminated. In response to this determination, FO system 113 may reschedule the deliveries so that they occur during the same wave. FO system 113 may reschedule the deliveries, for example, by performing one or more actions to ensure that each package is not shipped until the latest common wave. Actions that FO system may perform are described in further detail with reference to FIGS. 6A, 6B, and 6C.

In some embodiments, at step 506, FO system 113 may determine that the first delivery wave is associated with an earlier time period than the second delivery wave and that the second delivery wave was determined based on the second product not meeting a condition. The condition may be based on the identifier and/or the order information associated with the product, and may indicate whether the product or the customer that ordered the product is qualified for an expedited delivery. The product may qualify for expedited delivery due to the product being readily available at an FC for delivery. However, the product may also qualify for expedited delivery due to certain conditions that are met by the customer. Many order processing systems may offer expedited delivery services to customers that either pay a one-time expedited delivery fee for the product or a subscription fee to the order processing system so that they receive complimentary expedited deliveries for products ordered through the system.

For example, an order including multiple products may be from a customer that has not paid a one-time fee or a subscription fee, and thus the products in the order do not meet the condition for expedited delivery. However, when the delivery wave and FC are determined for each product in the order, their deliveries may still be scheduled on separate waves on the same day. In some cases, the product or products scheduled for delivery during the later wave may have been available for delivery in the earlier wave and may have otherwise qualified for delivery during the earlier wave had the customer paid the one-time fee or the subscription fee. Thus, although the one-time fee or the subscription fee may be implemented to offset the costs of expedited delivery, the lack of payment thereof may, in some cases, result in increased costs due to split deliveries. In these cases, it may be more cost efficient to deliver all of the products in the earlier wave despite some of the products not meeting the condition. To address this, FO system 113 may, in some embodiment, be configured to determine whether one or more products were scheduled for delivery in a later wave because they did not meet the condition for the earlier wave. In response to this determination, FO system 113 may then reschedule the deliveries so that they occur during the earlier wave rather than the latest common wave.

FIG. 6A provides exemplary process 610 that may be performed to reschedule the deliveries of multiple products upon determining that they should be delivered in the same wave, consistent with disclosed embodiments. At step 611, FO system 113 may modify a database (e.g., database 301) to associate the first product with the second delivery wave. Modifying the database may include overwriting the previously stored first delivery wave in association with the first product and replacing the stored first delivery wave with the second delivery wave. As a result, the memory stored in the database will reflect that the first product is now scheduled for delivery during the second wave. At step 612, FO system 113 may also forward computer instructions to at least one mobile device (e.g., mobile devices 107A, 107B, and 107C of transportation system 107) to generate a graphical user interface displaying the first product and information associated with the second delivery wave. Generating a graphical user interface may include displaying a notification on the mobile device indicating which package to deliver and which wave it should be delivered in. The generated graphical interface may be generated as part of a program or application downloaded onto the user device.

Figure 7:
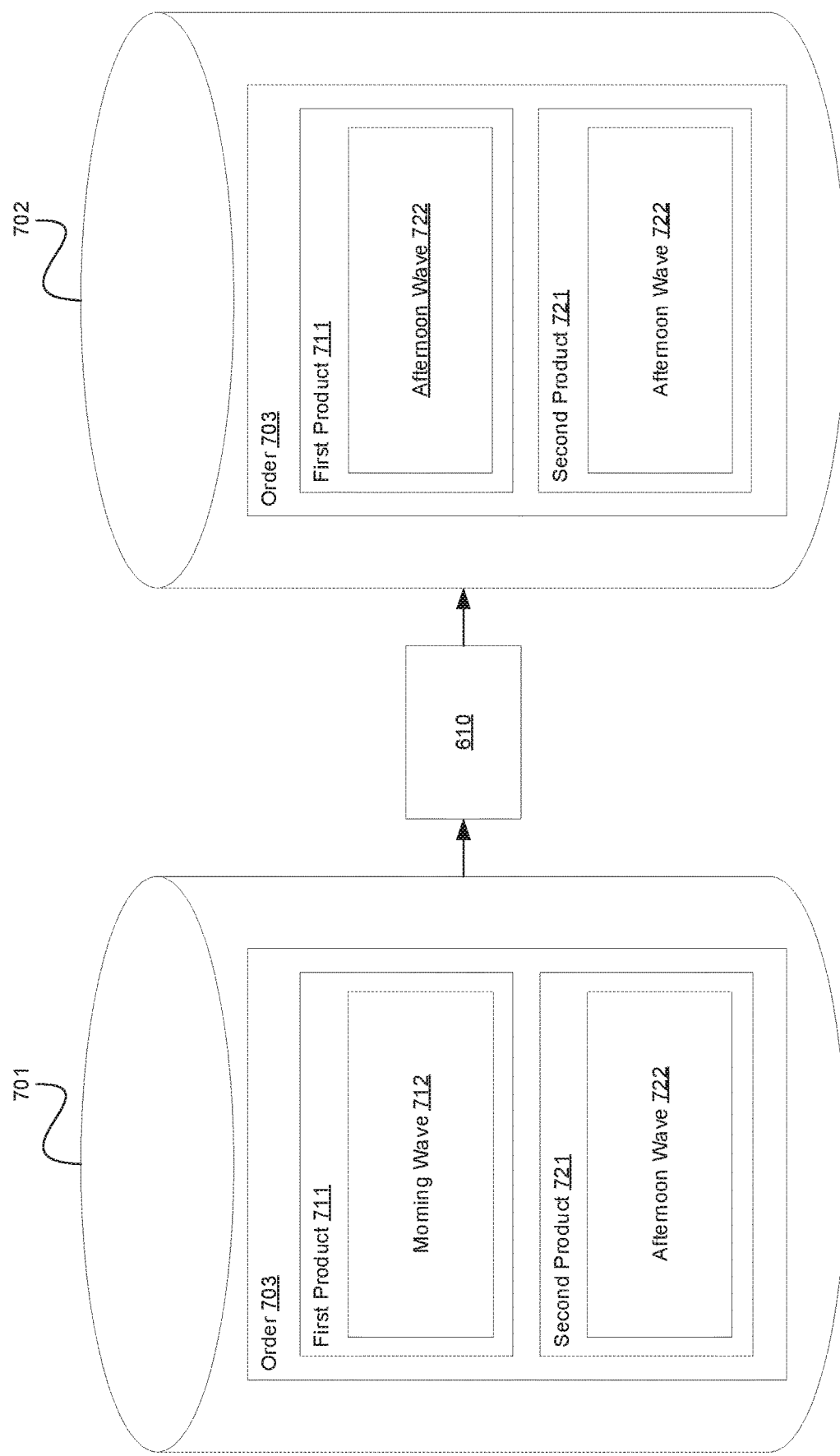
FIG. 7 provides an illustration of how product information stored in a database may be modified in order to reschedule delivery, consistent with disclosed embodiments.

FIG. 7 provides an illustration of how product information stored in a database may be modified in order to reschedule delivery. The figure depicts database 701 as undergoing step 611 of process 610, thereby resulting in modified database 702. Database 701 and modified database 702 may be the same database previously described in the present disclosure (e.g., database 301). Originally, database 701 contains information corresponding to order 703, in which first product 711 and second product 721 are associated with morning wave 712 and afternoon wave 722, respectively. However, in this example, FO system 113 has determined that both products should be delivered during afternoon wave 722 and thus implements process 610. After undergoing step 611 of process 610, the information corresponding to order 703 stored in modified database 702 may indicate that first product 711 and second product 721 are both associated with afternoon wave 722.

After the database has been modified to reflect the updated delivery schedule, a request for information to the database may return information associated with the second delivery wave. This may occur, when the first product is scanned by a mobile device at any point during the delivery process. The mobile device, in some embodiments, may return information associated with the second delivery wave that it retrieved from the modified database.

In some embodiments, however, the mobile device may only return information associated with the product or package label if the mobile device is not configured to retrieve the information from the database. Further, delivery workers may only consult the label to determine the delivery wave, and thus may be notified that the delivery wave may have been changed. Thus, it may be desirable to implement systems to replace the package label in response to a determination by FO system 113 that the delivery of one or more products should be rescheduled to a different wave.

FIG. 6B provides a flow chart illustrating exemplary process 620 that may be performed to print and replace a package label upon determining that its delivery should be rescheduled to another wave, consistent with disclosed embodiments. At step 621, FO system 113 may forward a second set of instructions to a printing device. The second set of instructions may be a set of computer instructions configured to cause the printing device to print a label listing the information associated with the second wave. The printing device may be a mobile device (e.g., mobile devices 107A, 107B, and 107C of transportation system 107) or any other device associated with system 100. The printing device may also be a printer (e.g., laser, inkjet, or thermal). Printing a label listing the information associated with the second wave may include printing a label including an updated bar code or other identifier that, when scanned by a mobile device, causes the mobile device to display information associated with the second wave. Although FIG. 6B depicts step 621 as occurring after step 612, process 620 may also occur independently and/or in parallel to process 610.

Figure 6C:
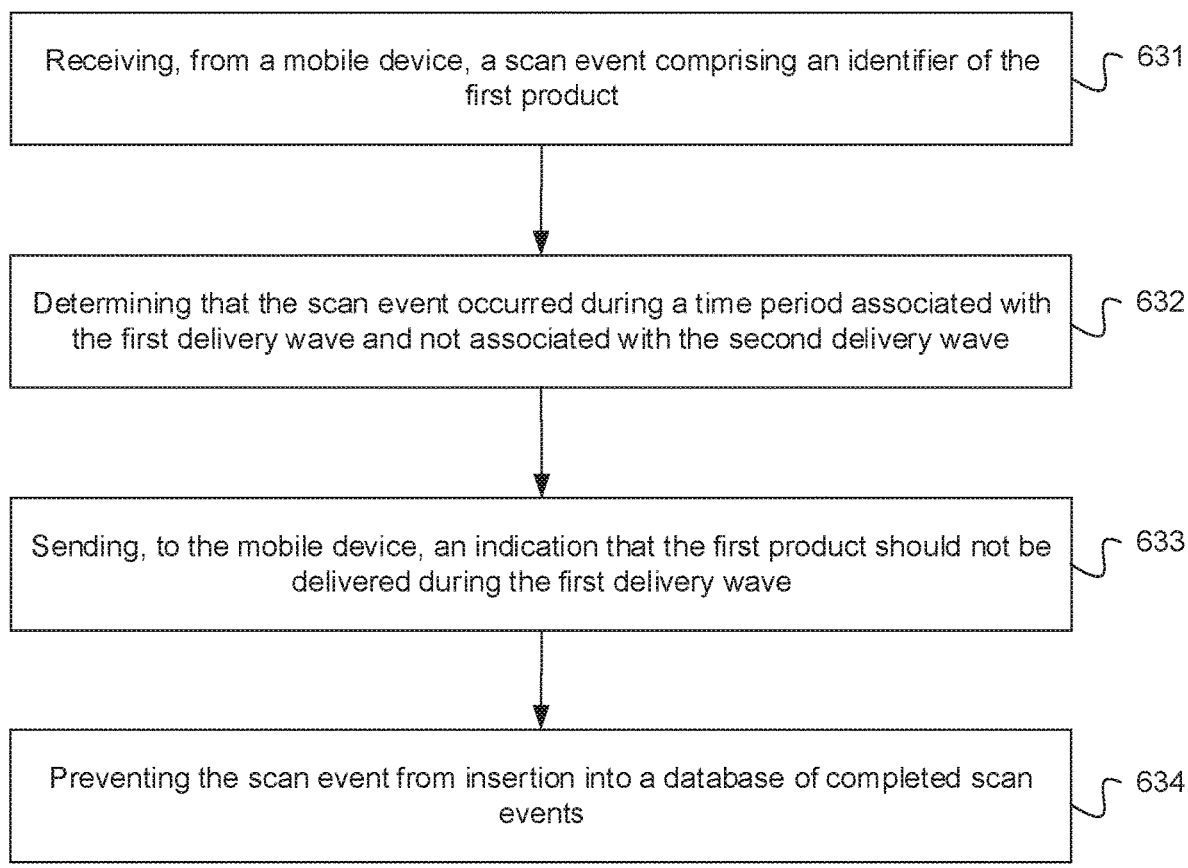
FIG. 6C provides a flow chart illustrating an exemplary process that may be performed to prevent the delivery of a product during a wave after its delivery has been rescheduled to different wave, consistent with disclosed embodiments.

FIG. 6C provides a flow chart illustrating exemplary process 630 that may be performed to prevent the delivery of a product during a wave after its delivery has been rescheduled to a different wave, consistent with disclosed embodiments. At step 631, FO system 113 may receive a scan event including an identifier of a first product from a mobile device (e.g., mobile devices 107A, 107B, and 107C of transportation system 107). The scan event may occur, for example, when a worker or machine in camp zone 215 scans the first product before delivering the product to determine its eventual destination. This scan event may occur during a time period corresponding to a first wave. If the FO system 113 has rescheduled the delivery of the first product to a second wave, process 630 may continue to step 632. At step 632, FO system 113 may determine that the scan event occurred during a time period associated with the first delivery wave and not associated with the second wave based on the received scan event. In other words, FO system 113 may be configured to recognize that the first package is about to be delivered during the wrong wave.

After step 632 is completed, process 630 may continue to step 633. At step 633, FO system 113 may send an indication that the first product should not be delivered during the first delivery wave to the mobile device. This indication may include a notification that may be displayed, for example, on a user interface of the mobile device notifying the use that the first product should instead be delivered in the second wave, or whichever wave its delivery was reassigned to. The worker may then hold the product until the second wave so that it may be delivered with the second item simultaneously.

After step 633 is completed, process 630 may continue to step 634. At step 634, FO system 113 may prevent the scan event from insertion into a database of completed events. Normally, in the course of delivery, the scan event may insert the scan event into a database associated with system 100 so that SAT system 101 may manage and monitor the status of deliveries. This database may be the same database used to store information regarding the FCs and waves associated with each product (e.g., databases 201 and 601), or it may be a separate database associated with system 100 (e.g., a dedicated database used by SAT system 101 to monitor deliver status). However, SAT system 101 may make an incorrect determination that the product is out for delivery based on the scan event being inserted into the database when it is actually being held for delivery during a later wave, which may disrupt delivery or cause unnecessary complications. To address this, FO system 113 may prevent the insertion of the scan event into the database if it has sent an indication to a mobile that it should not be delivered in the wave associated with the time period in which the scan event occurred.

In some embodiments, inserting the scan event may include the mobile device sending to the database a data packet including information indicating that the scan event occurred, and preventing the insertion may include intercepting the data packet and deleting the data packet. In some embodiments, the database may receive the data packet, and preventing the insertion may include removing the data packet from the database. Preventing the insertion may also include marking the database as read-only so that if the data packet is received, the information in the data packet including the scan event cannot be inserted into the database. In some embodiments, preventing the scan event may include transmitting instructions to the mobile device that prevent the mobile device from sending the packet to the database.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computerized system for delivery wave scheduling, comprising:
   at least one processor; and
   at least one non-transitory storage medium comprising instructions that, when executed by the at least one processor, cause the at least one processor to perform steps comprising:
   receiving order information comprising a plurality of products;
   determining a first delivery wave, from a plurality of delivery waves, for a first product of the plurality of products;
   determining a second delivery wave, from the plurality of delivery waves, for a second product of the plurality of products, the second delivery wave being different from the first delivery wave; and
   determining that the first delivery wave is associated with an earlier time period than the second delivery wave, and responsive thereto:
   modifying a first database to associate the first product with the second delivery wave; and
   preventing a scan event from insertion into a second database of completed events when the scan event occurs during a time period associated with the first delivery wave and not associated with the second delivery wave, by:
   intercepting a data packet being sent to the second database upon completion of the scan event, including information indicating that the scan event occurred; and
   deleting the data packet.

2. The system of claim 1, wherein the steps further comprise determining a first fulfillment center associated with the first product and a second fulfillment center associated with the second product based on the order information.

3. The system of claim 2, wherein the order information is received from a remote system.

4. The system of claim 3, wherein determining the first and second fulfillment centers comprises:
   determining a region associated with information associated with the remote system; and
   determining a fulfillment center from a set of fulfillment centers associated with the determined region.

5. The system of claim 2, wherein the first fulfillment center and the second fulfillment center are different.

6. The system of claim 1, wherein the order information comprises two customer orders, having the first product in the first customer order and the second product in the second customer order.

7. The system of claim 1, wherein the steps further comprise:
   forwarding a set of computer instructions to a printing device, the set of computer instructions configured to cause the printing device to print a label listing the information associated with the second delivery wave.

8. The system of claim 1, wherein each wave occurs during a period of time comprising a plurality of the waves, and the steps further comprise determining that the first delivery wave and the second delivery wave occur during the same period of time.

9. The system of claim 2, wherein determining the first and second fulfillment centers comprises:
   storing in a database a plurality of previous electronic requests and associated fulfillment centers;
   dividing the previous electronic requests in a training dataset and a validation dataset, the training dataset having more requests than the validation dataset;
   generating a predictive model based on the training data set associating request information and fulfillment centers;
   validating the predictive model using the validation dataset; and
   determining the first and second fulfillment centers by applying the predictive model to the electronic request.

10. The system of claim 2, wherein determining the first and second fulfillment centers comprises comparing a schedule of wave deliveries of a product with the average travel time of the product through each fulfillment center in a plurality of fulfillment centers.

11. A computer implemented method for delivery wave scheduling, comprising:
   receiving order information comprising a plurality of products;
   determining a first delivery wave, from a plurality of delivery waves, for a first product of the plurality of products;
   determining a second delivery wave, from the plurality of delivery waves, for a second product of the plurality of products, the second delivery wave being different from the first delivery wave; and determining that the first delivery wave is associated with an earlier time period than the second delivery wave, and responsive thereto:
modifying a first database to associate the first product with the second delivery wave; and
preventing the scan event from insertion into a second database of completed events when the scan event occurs during a time period associated with the first delivery wave and not associated with the second delivery wave, by:
intercepting a data packet being sent to the second database upon completion of the scan event, including information indicating that the scan event occurred; and
deleting the data packet.

12. The method of claim 11, further comprising determining a first fulfillment center associated with the first product and a second fulfillment center associated with the second product based on the order information.

13. The method of claim 12, wherein the order information is received from a remote system.

14. The method of claim 13, wherein determining the first and second fulfillment centers comprises:
determining a region associated with the remote system information; and
determining a fulfillment center from a set of fulfillment centers associated with the determined region.

15. The method of claim 12, wherein the first fulfillment center and the second fulfillment center different.

16. The method of claim 11, wherein the order information comprises two customer orders, having the first product in the first customer order and the second product in the second customer order.

17. The method of claim 11, wherein the steps further comprise:
forwarding a set of computer instructions to a printing device, the set of computer instructions configured to cause the printing device to print a label listing the information associated with the second wave.

18. The method of claim 11, wherein each wave occurs during a period of time comprising a plurality of waves, and the steps further comprise determining that the first delivery wave and the second delivery wave occur during the same period of time.

19. The method of claim 12, wherein determining the first and second fulfillment centers comprises:
storing in a database a plurality of previous electronic requests and associated fulfillment centers;
dividing the previous electronic requests in a training dataset and a validation dataset, the training dataset having more requests than the validation dataset;
generating a predictive model based on the training data set associating request information and fulfillment centers;
validating the predictive model using the validation dataset; and
determining the fulfillment center by applying the predictive model to the electronic request.

20. The method of claim 12, wherein determining the first and second fulfillment centers comprises comparing a schedule of wave deliveries of a product with the average travel time of the product through each fulfillment center in a plurality of fulfillment centers.

* * * * *